United States Patent [19]

Oka

[11] Patent Number: 5,065,233
[45] Date of Patent: Nov. 12, 1991

[54] COLOR IMAGE FORMING APPARATUS

[75] Inventor: Tateki Oka, Osaka, Japan

[73] Assignee: Minolta Camera Kabushiki Kaisha, Osaka, Japan

[21] Appl. No.: 398,075

[22] Filed: Aug. 24, 1989

[30] Foreign Application Priority Data

| Aug. 24, 1988 | [JP] | Japan | 63-210179 |
| Aug. 24, 1988 | [JP] | Japan | 63-210180 |
| Aug. 24, 1988 | [JP] | Japan | 63-210181 |
| Jan. 30, 1989 | [JP] | Japan | 1-22130 |
| Jan. 30, 1989 | [JP] | Japan | 1-22131 |

[51] Int. Cl.$^5$ .............................. H04N 1/46
[52] U.S. Cl. ......................... 358/75; 355/246; 355/326; 358/80
[58] Field of Search ............. 358/75, 80, 78; 355/246, 326

[56] References Cited

U.S. PATENT DOCUMENTS

| 4,549,803 | 10/1985 | Ohno et al. | 355/14 FU |
| 4,672,432 | 6/1987 | Sakurada et al. | 358/75 |
| 4,740,833 | 4/1988 | Shiota et al. | 358/75 |
| 4,751,535 | 6/1988 | Myers | 346/157 |
| 4,862,255 | 8/1989 | Takanashi et al. | 358/75 |
| 4,893,177 | 1/1990 | Tada et al. | 358/75 |
| 4,905,079 | 2/1990 | Hayashi | 358/75 |
| 4,920,411 | 4/1990 | Miyakawa | 358/75 |
| 4,949,125 | 8/1990 | Yamamoto et al. | 355/246 |
| 4,952,986 | 8/1990 | Maeda et al. | 355/246 |
| 4,955,317 | 9/1990 | Kinoshita et al. | 395/246 |

Primary Examiner—Howard W. Britton
Assistant Examiner—Michael H. Lee
Attorney, Agent, or Firm—Willian Brinks Olds Hofer Gilson & Lione

[57] ABSTRACT

A color image forming apparatus comprises developing units each of which contains a developer of each of three primary colors, and another developing unit containing a white developer. An image on the original is subjected to color separation to obtain image density data corresponding to each primary color, and when all the density data are lower than a predetermined value, the density data are multiplied by a predetermined ratio, and a predetermined density of a white image is set. Based on the multiplied data of each color a developed image corresponding to the image density data of each primary color is formed on a recording material, and a white image corresponding to the white color density data is on the same recording material, thereby reproducing clear pastel or halftone color images.

31 Claims, 10 Drawing Sheets

COLOR IMAGE FORMING APPARATUS

BACKGROUND OF THE INVENTION

The present invention relates generally to a color image forming apparatus, such as a digital multi-color printing machine and a digital multi-color copying machine. More particularly the present invention relates to a color image forming apparatus including developing units each of which contains a developer of each of at least three primary colors to form a multi-color image.

It is known in the art to reproduce halftone or pastel color by reducing the density of dots. However the reduced density of dots makes the scattering of dots conspicuous, which is characteristic of the digital systems, thereby making it difficult to reproduce clear pastel or halftone color; particularly difficult in blue and red which are inherently deep color.

SUMMARY OF THE INVENTION

Accordingly, an object of the present invention is to provide a color image forming apparatus for reproducing clear pastel or halftone color without making the scattering of dots conspicuous.

According to one aspect of the present invention there is provided an apparatus for producing a color image on a recording material, the apparatus comprising developing units each of which contains a developer of each of at least three primary colors, a first means for chromatically separating an image on the original to output image density data corresponding to each primary color, a second means for comparing the image density data with a predetermined value, multiplying the image density data by a predetermined ratio depending on the results of the comparison, and setting a predetermined density of a white image, a second developing unit containing a white developer, and a third means for controlling the formation of an image with operating the second developing unit in response to the image density data obtained from the second means.

The second means can perform the multiplication and the white density setting for a picture element whose image density data corresponding to the three primary colors are lower than the predetermined value.

Alternatively, the second means may carry out these performances for a picture element whose image density data corresponding to a selected one or more colors of the primary colors are lower than the predetermined value. In this case, the primary colors can be yellow, magenta and cyan, and the selected colors should be two of them including at least one of magenta and cyan, for at least two reasons as follows:

(1) In the case of deep or dark colors such as magenta and cyan it is difficult to reproduce clear pastel or halftone color because of the conspicuous scattering of dots, but the yellow has no such problem because of its inherent light color.

(2) When the yellow, magenta and cyan are printed together, the resulting color density looks uniform even when the tone is light. However, when one or two of them are printed together, the scattering of dots becomes conspicuous.

The third means may include means for obtaining a binary image data from the image density data.

Preferably the magnification ratio of the image density used in the second means is virtually equal to the reciprocal of the reduction ratio of the density of a primary color owing to the white development.

The apparatus may be provided with means for generating a signal indicating that the recording material is a synthetic resin film, and a controller which keeps the second means out of operation in response to the signal. It is preferable to use synthetic resin films of the type which is transparent and used for overhead projectors.

The signal generating means can be a switch operable from outside or else a light reflector type of sensor disposed in the path along which the recording material is transported.

According to another aspect of the present invention, there is provided an apparatus for producing a color image on a recording material, the apparatus comprising developing units each of which contains a developer for each of at least three primary colors, a first means for chromatically separating an image on the original to output image density data corresponding to each primary color, a first density setting means for comparing the image density data with a first predetermined value and effecting the under-color removal depending on the results of the comparison, a second density setting means for comparing the image density data with a second predetermined value and multiplying the image density data by a predetermined ratio depending on the results of the comparison, and setting a predetermined density of a white image, a second developing unit containing a white developer, a first controlling means for controlling the formation of an image without using the second developing unit in response to the density data provided by the first density setting means, and a second controlling means for controlling the formation of an image with using the second developing unit in response to the density data provided by the second density setting means.

The first predetermined value can be larger than the second predetermined value.

The first density setting means can perform the multiplication and the white density setting for a picture element whose image density data corresponding to the three primary colors are higher than the first predetermined value.

The second density setting means can perform the multiplication and the white density setting for a picture element whose image density data corresponding to the three primary colors are lower than the second predetermined value.

The second density setting means can perform the multiplication and the white density setting for a picture element whose image density data corresponding to a selected one or more colors of the primary colors are lower than the second predetermined value. In this case, it is preferred that the primary colors are yellow, magenta and cyan, and the selected colors are two of them including at least one of magenta and cyan.

Preferably the magnification ratio of the image density used in the second density setting means is virtually equal to the reciprocal of the reduction ratio of the density of a primary color owing to the white development.

The image density data generating means can include a section in which the masking is carried out.

The apparatus can be provided with means for generating a data indicating that the recording material is a synthetic resin film, and a controller which controls the second density setting means out of operation in response to the signal. According to a further aspect of the present invention, there is provided an apparatus for forming electrostatic latent images on an electrostatic latent image carrier corresponding to respective color components, developing the latent image with respective color developers, transferring each developed image onto a recording material thereby to obtain multicolor image, the apparatus comprising a plurality of developing units each of which contains a developer of each of the three primary colors, a second developing unit containing a white developer, a first means for chromatically separating an image on the original to output image density data corresponding to each primary color, a second means for comparing the image density data with a predetermined value, and means for alternatively controlling a first copying mode or a second copying mode, wherein the first copying mode is to form electrostatic latent images corresponding to the three primary colors, develop them by use of the plurality of developing units, and transfer the developed images onto the recording material, when the second means finds that the image density data are higher than the predetermined value, and wherein the second copying mode is to form electrostatic latent images corresponding to the three primary colors and a white color, develop these images by use of the plurality of developing units and the white developing unit, and transfer the developed images onto the recording material when the second means finds that the image density data are lower than the predetermined value.

In the second copying mode it is preferred that the white developed image is transferred onto the recording material later than the developed images of the primary colors. This ensures that the density of the developed images of primary colors is reduced by the white developer in the process of fixing a developer on the recording material.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE PREFERRED EMBODIMENTS

Figure 1:
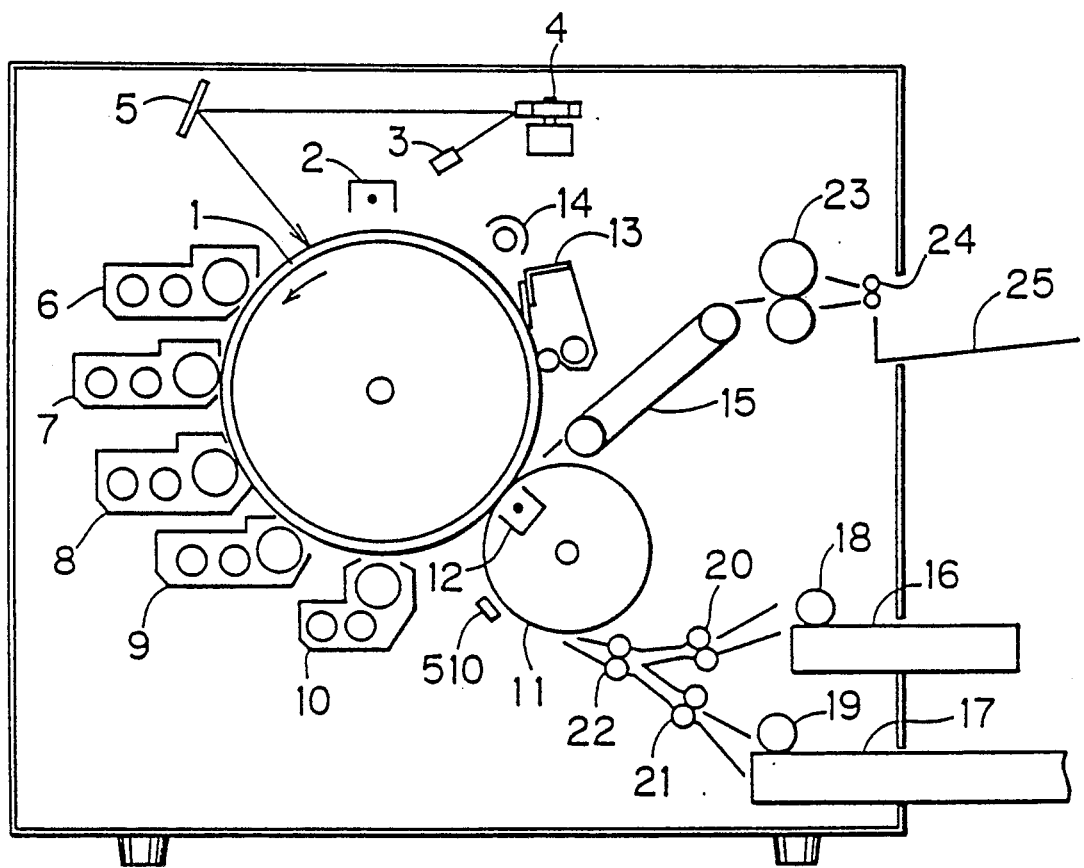
FIG. 1 is a schematic cross-sectional view of a digital color printer according to the present invention.

FIG. 1 is a diagrammatic sectional view showing a digital color printer according to the present invention. The color printer includes a photosensitive drum 1, which rotates in the direction of arrow in FIG. 1 by a driving means (not shown).

There are provided a charger 2, developing units 6, 7, 8, 9 and 10, a transfer charger 12, a cleaning device 13 and an eraser 14 disposed around the photosensitive drum 1. The developing unit 6 contains a white toner, the unit 7 contains a cyan toner, the unit 8 contains a magenta toner, the unit 9 contains a yellow toner, the unit 10 contains a black toner. The transfer charger 12 is accommodated in a transfer drum 11 which is provided with a gripper (not shown) for securing a recording material.

There is provided a semi-conductor laser generator 3 above the photosensitive drum 1. The laser generator 3 generates a laser light through its head, and the laser light is scanned by a polygon scanner 4, and after reflecting on the mirror 5, the laser light is directed against the photosensitive drum 1 to produce a latent image. In the optical path from the laser generator 3 to the drum 1 there are disposed known complementary optical systems.

Adjacent to the transfer drum 11 there are provided an upper cassette 16 and a lower cassette 17, each containing a stack of paper or any other recording material. The material contained in the cassettes 16 and 17 are fed out of them by feed rollers 18 and 19, respectively. The recording material is transported by rollers 20 or 21, and after the feeding timing is adjusted by timing rollers 22, the material is gripped by the gripper.

Above the transfer drum 11 there are provided a conveyor belt 15, thermally-fixing rollers 23, discharge rollers 24 and a tray 25. Between the timing rollers 22 and the transfer charger 12 there is provided a sensor 510 in opposition to the transfer drum 11.

The sensor 510 is a light reflector type, which includes a light emitting section and a light receiving section. When the sensor 510 detects that the recording material is not an ordinary transfer paper but a transparent synthetic resin film used for over-head projectors, hereinafter called "OHP" recording material. The light from the light emitting section of the sensor passes through the recording material, and after reflecting against the transfer drum 11, it is received by the receiving section. In this way the sensor tells that the recording material is the OHP material.

The color printer is operated as follows:

First, a latent image to be developed with cyan is formed on the photosensitive drum 1 by the optical systems 3, 4 and 5. The latent image is developed with cyan by the developing unit 7. The toner image is positioned at the part of the photosensitive drum 1 which faces the transfer charger 12, and a recording material is fed onto the transfer drum 11 from either the upper cassette 16 or the lower cassette 17. The recording material is secured to the drum 11 by the gripper, and rotates together with the drum 11. The cyan toner image is transferred by the charger 12 from the photosensitive drum 1 onto the recording material.

Secondly, a latent image to be developed with magenta is formed on the photosensitive drum 1 by the optical systems 3, 4 and 5. Likewise, latent images to be developed with yellow, black, and when necessary, white toner are consecutively formed, and transferred onto the recording material placed on the transfer drum 11. The recording material having the toner images is released from the gripper, and travel by the conveyor belt 15 through the thermally-fixing rollers 23 whereby the toner images are fused to produce a desired color and fix on the recording material. Then the finished recording material is discharged by the discharge rollers 24 onto the tray 25.

Every time the toner image is transferred from the photosensitive drum 1 onto the recording material a residual toners are removed from the photosensitive drum 1 by the cleaning device 13. The charges remaining on the photosensitive drum 1 are removed by the eraser 14, thereby enabling the photosensitive drum 1 to get ready for the subsequent process.

Figure 2:
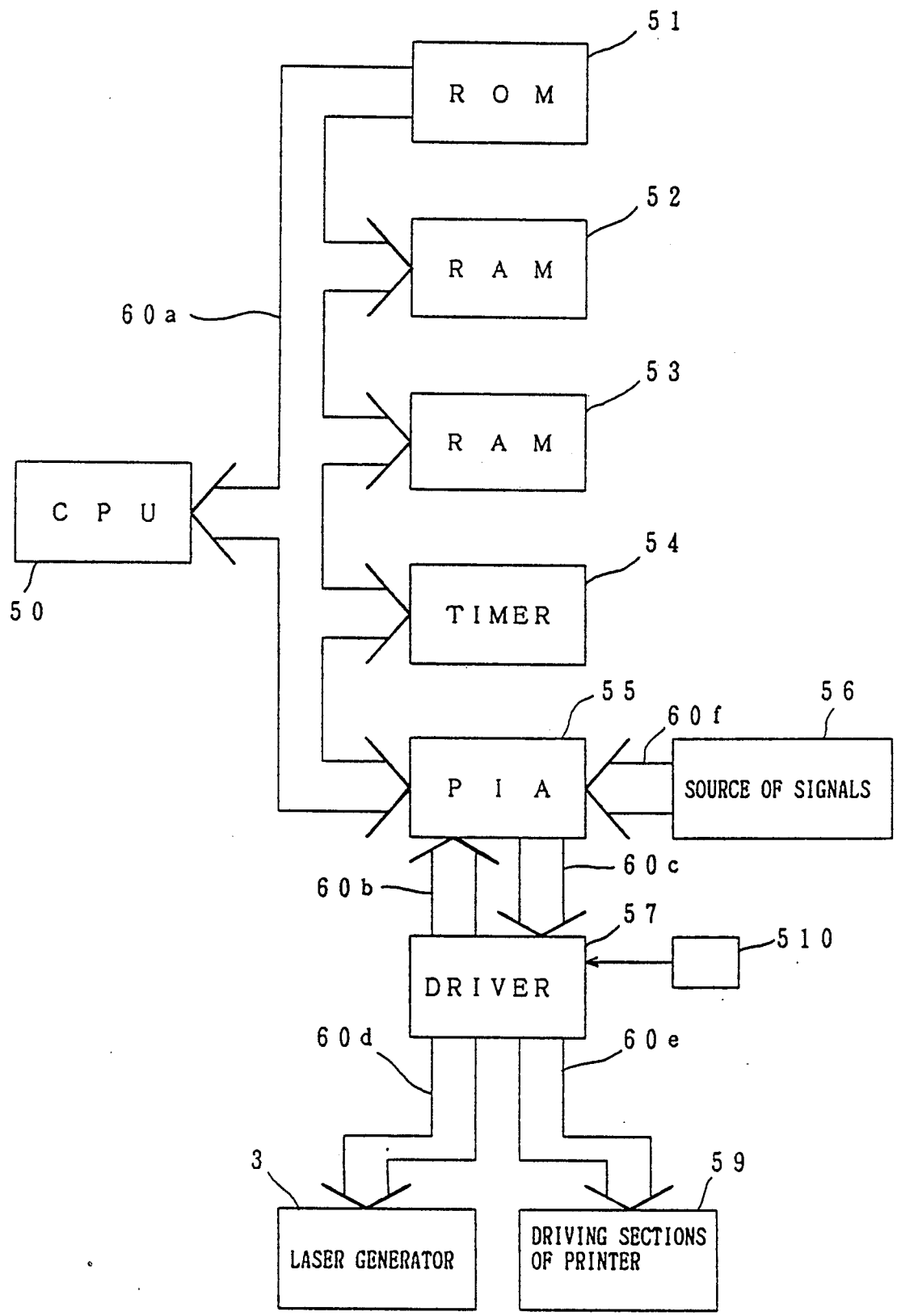
FIG. 2 is a block diagram of a control system for reproducing color.

Referring to FIG. 2, the structure of a control system for controlling the color reproduction by the color printer will be described:

Operations of driving sections 59 and the semi-conductor laser generator 3 of the printer are controlled by a driver 57. The driving sections 59 also control the rotation of the photosensitive drum 1, the selection of colors, etc. A signal from the sensor 510 is input to the driver 57.

The driver 57 is connected to a peripheral interface 55, hereinafter called "PIA", through bus lines 60b and 60c. The PIA 55 is connected to a signal source 56 through a bus line 60f, and the signal source 56 generates the image data about each of yellow, magenta and cyan.

THe PIA 55 is connected to a central processing unit (CPU) 50 through a bus line 60a together with a read only memory (ROM) 51 for storing the processing program, a random access memory (RAM) 52 for temporarily storing various data, another random access memory (RAM) 53, and a timer for controlling the timing of the processing program.

Figure 3:
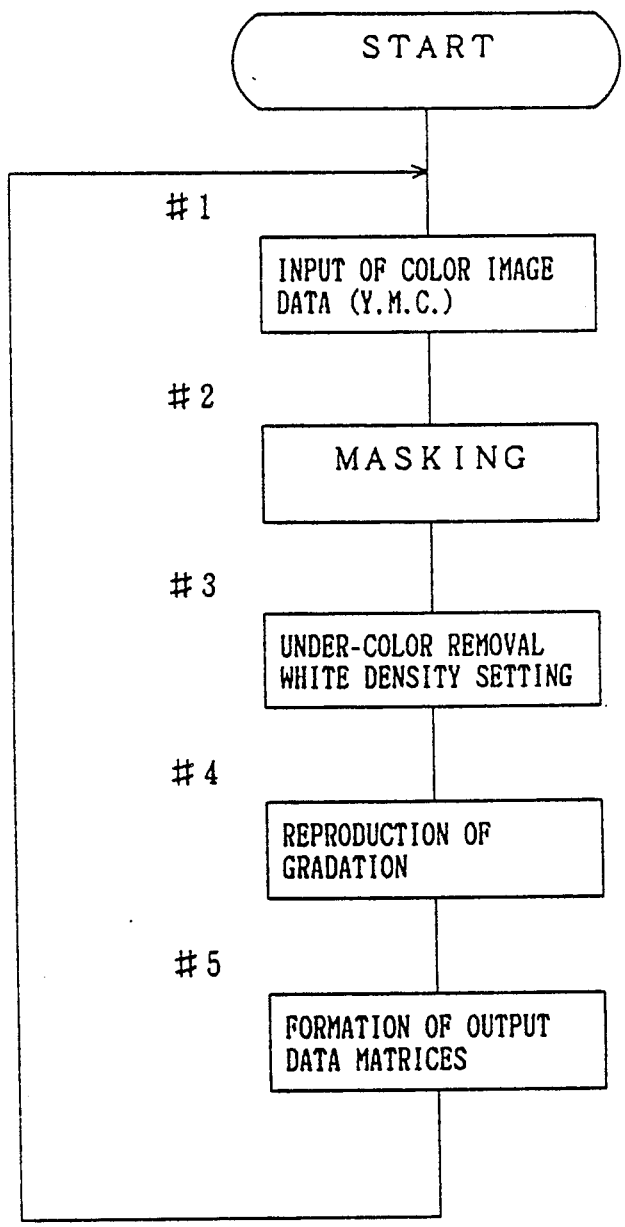
FIG. 3 is a flowchart showing an operational sequence conducted by the control system of FIG. 2.

The control system described above is operated to control the color reproduction in the process shown in FIG. 3:

Image signals about yellow, magenta and cyan, hereinafter called "Y", "M" and "C", respectively, after carrying out the color separation of the original image, are input to the CPU 50 from the source 56 in Step #1, and a masking is performed in Step #2. The masking is an operation which effects color correction because the toner to be used in the printer has no sufficient color filter density.

In order to effect the masking, the masking coefficient stored in the RAM 52 is read out, and the CPU 50 arithmetically operates the previously input densities of "Y", "M" or "C". The resulting density of each color is substituted as new data.

Figure 4:
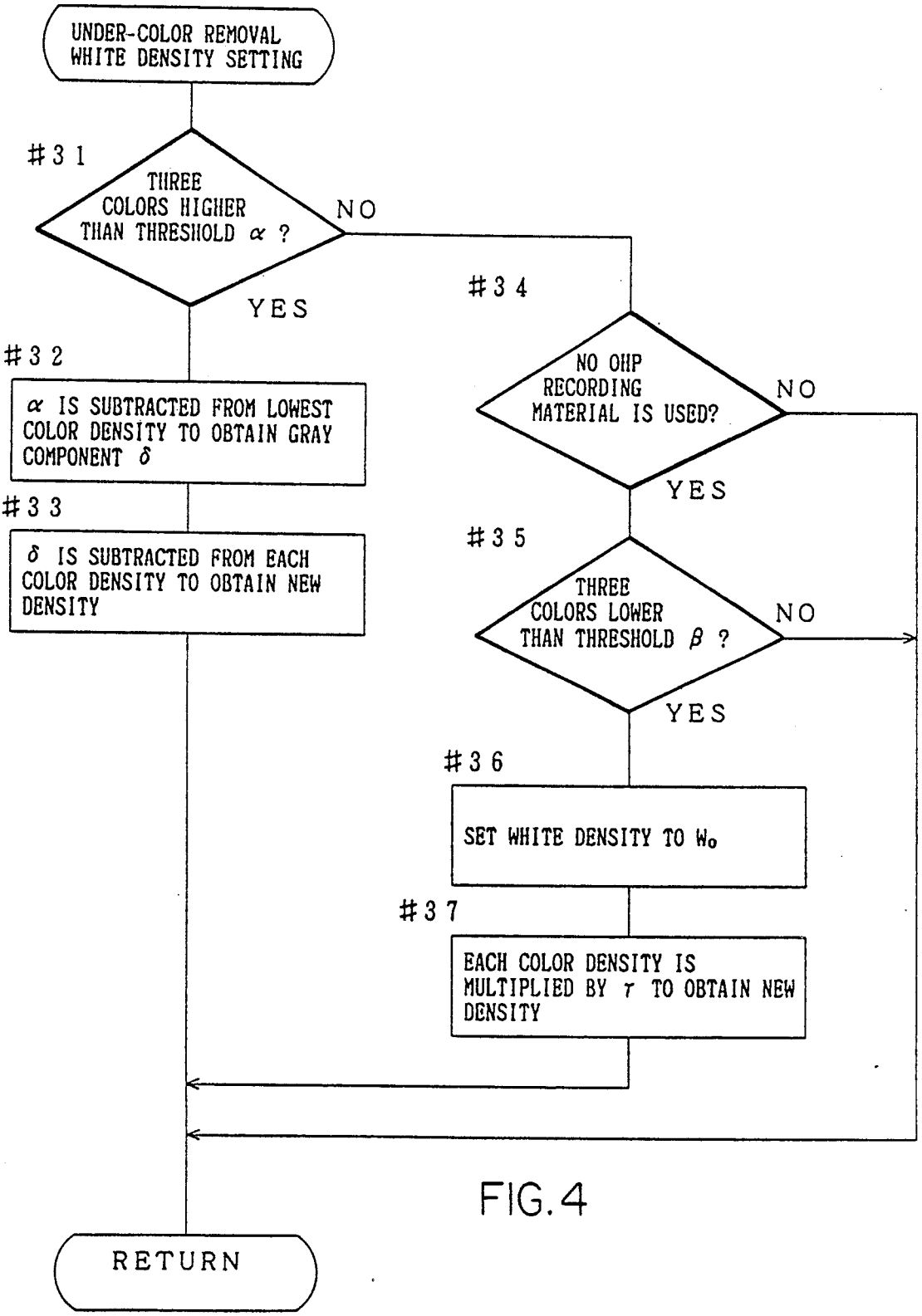
FIG. 4 is a flowchart showing a routine for performing the under-color removal and setting the white component density.

The sequence advances to Step #3 which effects the under-color removal and sets the white component density as shown in FIG. 4:

Step #31 compares the densities of "Y", "M" and "C" obtained by the masking with threshold $\alpha$ stored in the RAM 52 to effect the under-color removal. If each density is higher than the $\alpha$, the sequence advances to Step #32 where the threshold $\alpha$ is substracted from the lowest density of the three colors. In this way a gray component $\delta$ is obtained.

In Step #33 the gray component $\delta$ is substracted from each density of "Y", "M" and "C" to obtain new densities which are stored in the RAM 53 together with the gray component $\delta$.

In Step #31 if any of the densities is found to be lower than the threshold $\alpha$, the sequence advances to Step #34 which checks if the recording material is an OHP material. If it is judged that the recording material is an OHP material, the sequence returns to the main routine. If the recording material is found to be an ordinary paper, the sequence advances to Step #35.

Step #35 checks if each density of "Y", "M" and "C" is lower than the threshold $\beta$ necessary for reproducing halftone or pastel color. If all the densities are lower than the $\beta$, the sequence advances to Step #36. The threshold $\beta$ is previously stored in the RAM 52.

In Step #36, the white density is determined to be $W_o$, and it is previously stored in the RAM 52. The sequence advances to Step #37.

In Step #37 each density of "Y", "M" and "C" is multiplied by coefficient $\gamma$ to obtain new densities, wherein the $\gamma$ is previously stored in RAM 52. These new densities and the white density $W_o$ are stored in the RAM 53.

When all the densities are not higher than the threshold $\alpha$, and in the Step #35 if it is judged that all of them are not lower than the threshold $\beta$, the density data are stored in the RAM 53 as they are. In this way the under-color removal and the setting of white color component density are finished.

Figure 5A:
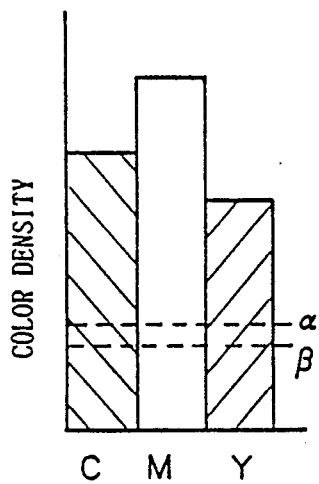
FIGS. 5A-5C and 6 are diagrammatic views illustrating examples of performing the under-color removal.
Figure 5B:
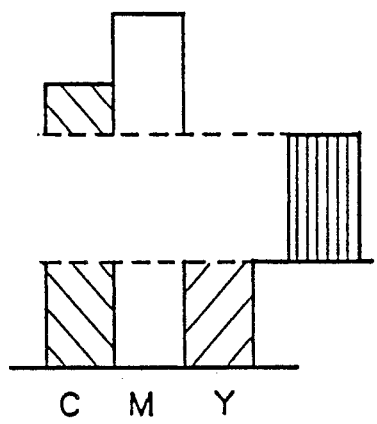
Figure 5C:
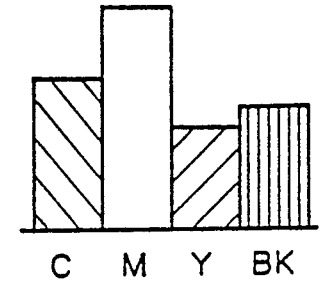

Steps #31, #32, and #33 are schematically shown in FIGS. 5(a), 5(b) and 5(c). It will be understood that in FIG. 5(a) the densities of "Y", "M" and "C" are higher than the threshold $\alpha$, of the three "Y" having the lowest density. The gray component $\delta$ can be obtained by substracting the threshold $\alpha$ from the "Y" density.

FIG. 5(b) shows that the gray component $\delta$ is substracted from each of the "Y", "M", "C". After the gray component $\delta$ has been substracted from each density, new densities of "Y", "M", "C" and "BK" (black) can be represented as shown in FIG. 5(c).

Figure 6:
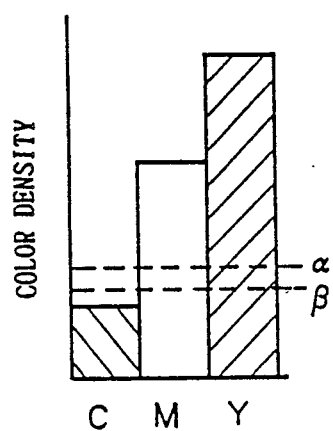

FIG. 6 shows a situation of Step #31 where one of the color densities is found to be lower than the threshold $\alpha$. In this situation the under-color removal is not carried out.

Figure 7A:
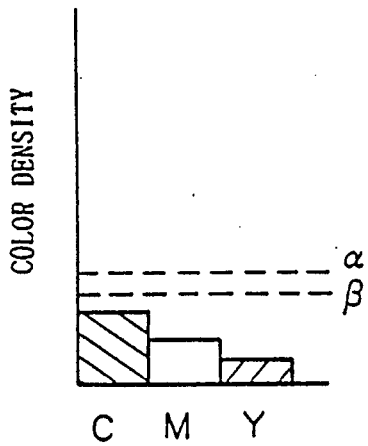
FIGS. 7A-7B are diagrammatic views illustrating examples of setting the white component density.
Figure 7B:
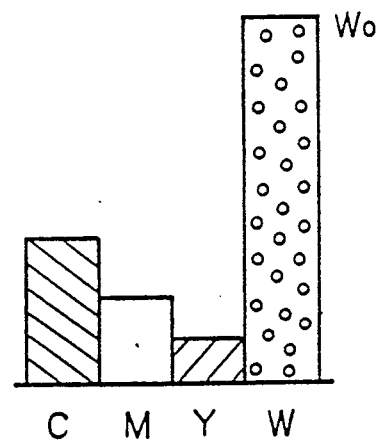

FIGS. 7(a) and 7(b) show that when the color densities of "Y", "M", "C" obtained by masking are all lower than the threshold $\beta$ and the recording material is not an OHP recording material, the white component density is set. FIG. 7(a) shows that the densities of "Y", "M", and "C" are lower than the threshold $\beta$, and FIG. 7(b) shows that $W_o$ is put as the white density W, and that each density of "Y", "M", "C" is multiplied by $\gamma$. The relationship between $W_o$ and $\gamma$ will be described below:

It is a matter of course that if at least one of the "Y", "M", "C" densities is higher than the threshold $\beta$, the white component density will not be set.

Again, reference will be made to FIG. 3:

In Step #3, after the under-color removal and the white component density setting are carried out, the sequence advances to Step #4 where the reproduction of gradation is carried out and then to Step #5 where the output data matrices are formed; that is, the density data stored in the RAM 53 are translated into output data matrices by a dither method. For example, the input data about cyan is translated into a 3×3 matrix, which is compared with the threshold matrix for cyan stored in the RAM 52. The results are stored in the RAM 53 as an output data matrix. The data about "M", "Y" and "BK" are processed in the same manner.

However, the data about white "W" is different from the others; more specifically, the density data about "W" stored in the RAM 53 is either O or $W_o$, and when it is $W_o$, there is no alternative but to print white. After all, as far as the "W" is concerned, it is arranged so that every point of the threshold 3×3 matrix is larger than 0 but smaller than $W_o$. Alternatively every point of the matrix may be constant with one value.

Figure 9:
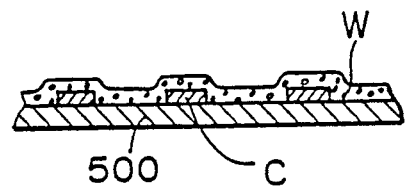
FIG. 9 is a schematic enlarged view showing the positional relationship among a recording material, a color image and a white toner layer.

The development up to the printing is conducted in the following sequence:

The development of each color is conducted in the order of "C", "M", "Y", "BK" and "W", wherein the color not to be printed will be omitted. It is possible to change the order among "C", "M", "Y" depending on the tone and meltability of the toners but it is desirable to develop "W" after "C", "M", "Y", are developed for the following reason:

The function of the white toner is to whiten the color image or reduce the density thereof by its presence in the toner image. The whitening actually takes place when the toners fuse during travel through the thermally-fixing rollers 23. As shown in FIG. 9, when the recording material 500 having a white toner image on a color toner image passes through the thermally-fixing rollers 23, the density of the color toner reduces even if the toners are not evenly mixed. If, however, the recording material having a color toner image on a white toner image, the density of toner image is likely to be insufficiently reduced. In order to enable the recording material 500 to have a white toner layer on a "Y", "M" or "C" toner, the following printing sequence can be followed on the printer of FIG. 1:

1. The development and transfer of "C" (cyan)

The output data matrix about "C" stored in the RAM 53 is accessed, and simultaneously the laser generator 3 and other parts of the printer are controlled so that the "C" image is formed on the photosensitive drum 1, and after developing the image is transferred on the recording material placed on the transfer drum 11, wherein the developing unit 7 containing a "C" toner is put into operation but the other units 6, 8, 9 and 10 are kept inoperative.

2. The development and transfer of "M"

The output data matrix about "M" stored in the RAM 53 is accessed, and a "M" toner image is formed on the "C" toner image on the recording material.

3. The development and transfer of "Y"

The same operation as described in (1) is conducted on the output data maxtrix about "Y" stored in the RAM 53.

4. The development and transfer of "BK"

The same operation as described in (1) is conducted on the output data matrix about "BK" stored in the RAM 53.

5. The development and transfer of "W"

The same operation as described in (1) is conducted on the output data matrix about "W" stored in the RAM 53.

The steps (1) to (5) are taken to form toner images of the five colors on the recording material. After being released from the gripper of the transfer drum 11, the recording material is fed to the thermally-fixing rollers 23. So long as the sequence mentioned above is followed, the toner images are transferred on the recording material in the order of "C", "M", "Y" (and "BK" or "W"), thereby ensuring that when the printing takes place, the "W" layer is on top of the "C", "M", "Y" toner images. (see FIG. 9)

Between "BK" and "W" there need not be definite order; any of them may come first. This is because of the impossibility of overlapping between "BK" and "W". More specifically, in Step #31 (FIG. 4) if the answer is YES, the picture element subjected to under-color removal advances to Step #32 without being subjected to the setting of white component density in Steps #35 and #36.

Figure 8:
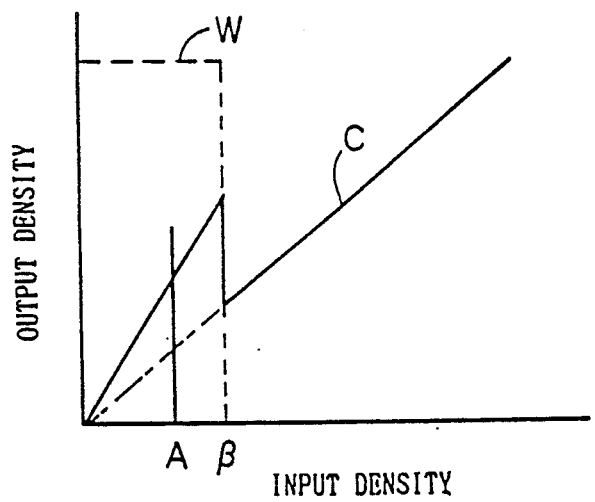
FIG. 8 is a graph showing the relationship between the input cyan density and the output cyan density in the printer of FIG. 1.

The characteristics of an output image will be described:

For simplicity, reference will be made only to a printed "C" (cyan) image:

FIG. 8 shows the relationship between the input density and the density output by the printer of FIG. 1. As is evident from FIG. 3, when the input density is lower than the threshold $\beta$, the white component density is set, thereby ensuring that the the density of "C" is multiplied by $\gamma$ (see the full lines in FIG. 8) and that the white color is printed with the density of $W_0$ (see the dotted lines in FIG. 8).

The relationship between the coefficient $\gamma$ and the density $W_0$ is as follows:

For example, in the case of FIG. 9, the "C" dots are covered with a white toner, thereby resulting in the reduced density of the "C" image. The $\gamma$ is a coefficient which is required to restore the reduced color densities of cyan and others to their original densities. In other words, the coefficient $\gamma$ is virtually equal to the reciprocal of the reduction ratio of each density of yellow, cyan and magenta owing to the white printing. The illustrated example found that the development using the white toner reduced the density of "C" by about $\frac{1}{2}$; therefore, it was decided that the $\gamma$ was 2.

As a result of the treatment mentioned above, the characteristics of the output density is that even if the input density is lower than the threshold $\beta$, the density line has no break and continues to the line beyond the threshold $\beta$ as indicated by the dotted lines in FIG. 8, thereby maintaining the 1:1 relationship with the input density.

Figure 10:
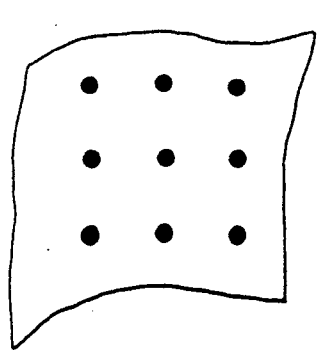
FIGS. 10A-10B are schematic enlarged views comparing between printed color images obtainable under the prior art and under the present invention.
Figure 10:
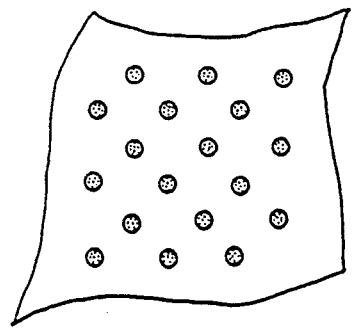

Referring to FIG. 10 the printing of color images will be described:

In the printer of FIG. 1 the low density portion is output in the pattern of dots scattered by the reproduction of gradation. In FIG. 8 the input density (A), which is lower than $\beta$, would otherwise be output as the image shown in FIG. 10(a). In the printer of FIG. 1 the input density is raised by the coefficient $\gamma$ (=2), and as an output image the density of dots is two times that of FIG. 10(a). Each dot is covered with a white toner, and the density of each dot is reduced by about $\frac{1}{2}$, thereby making the dots look whitened. FIG. 10(b) schematically shows this state of dots. As compared with FIG. 10(a) the scattering of dots is less conspicuous. It will be appreciated from FIG. 10(b) that light or half-tone color is evenly reproduced.

As described above, if the recording material is an OHP recording material, the halftone reproducing treatment with a white toner is not carried out. Instead, the OHP produces an image on the recording material in a shadeless pure state.

Figure 11:
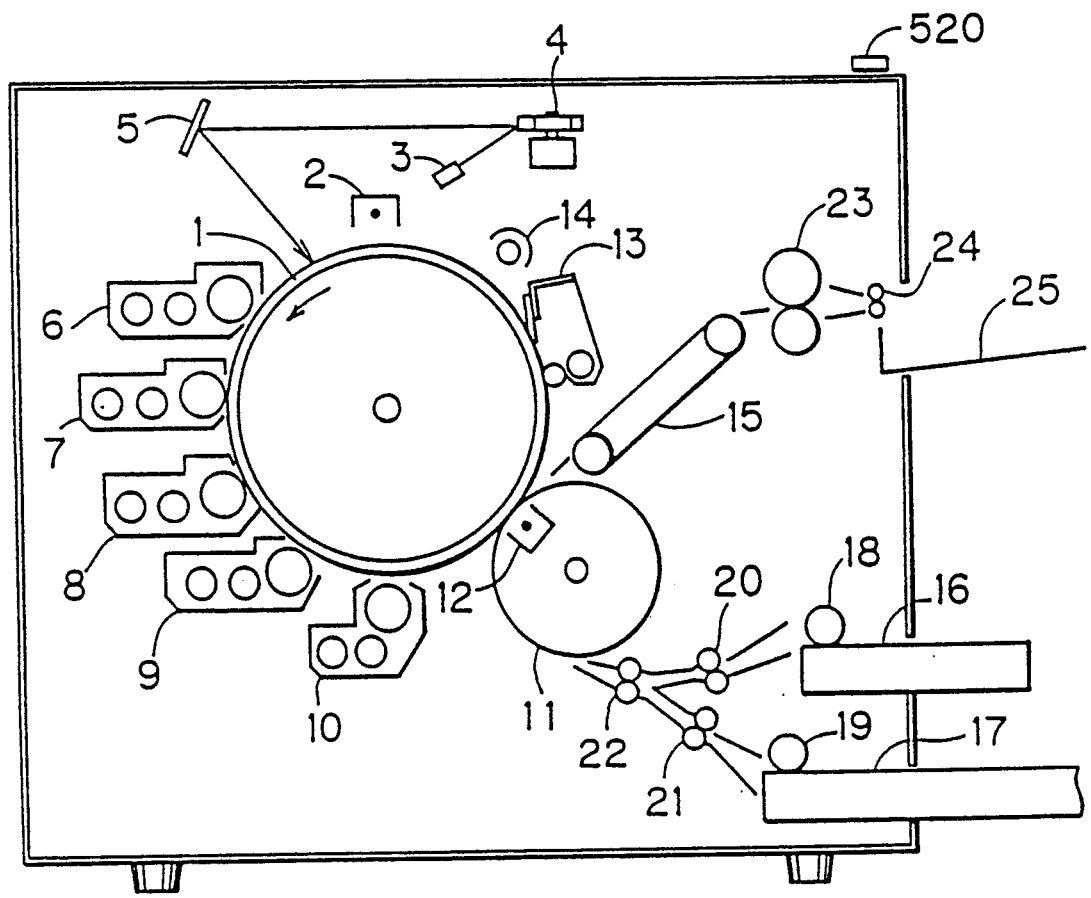
FIG. 11 is a schematic cross-sectional view of a digital color printer according to a second modification of the present invention.

Referring to FIG. 11, a second embodiment will be described:

The illustrated apparatus, instead of the sensor 510 in the printer of FIG. 1, is provided with a switch 520 outside of the body frame. The switch 520 functions as a mode selector which selects the mode in which the white toner is not used to reproduce halftone when the recording material is an OHP recording material.

The control system used in the apparatus of FIG. 11 is substantially the same as the one shown in FIG. 2 except for the sensor 510 which is replaced by the switch 520. A mode selecting signal is input to the driver 57 by the switch 520.

Figure 12:
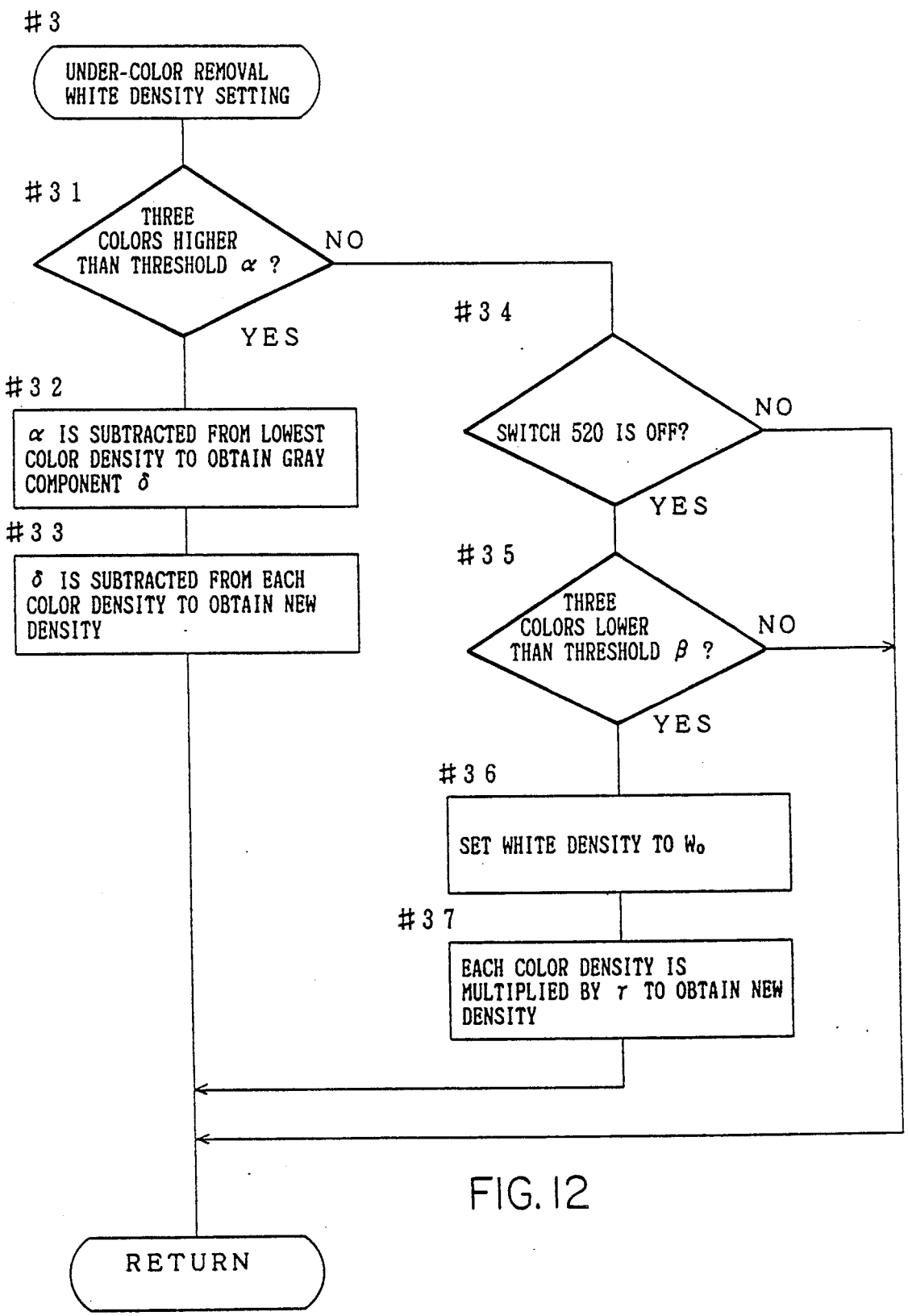
FIG. 12 is a flowchart showing a routine for performing the under-color removal and setting the white component density in the printer of FIG. 11.

The halftone reproduction is effected in the same sequence as shown in FIG. 3 except for Step #3, which is replaced by a sequence shown in FIG. 12.

In Step #31 the density of each masked "Y", "M" and "C" is compared with the threshold α for under-color removal which is stored in the RAM 52. If all the densities are higher than the α, the sequence advances to Step #32 where the α is subtracted from the lowest of the three densities to obtain the gray component δ.

In Step #33 the gray component δ is subtracted from each density of "Y", "M" and "C" to obtain new densities, and they are stored in the RAM 53 together with the gray component δ.

In Step #31 if any of the densities is found to be lower than the threshold α, the sequence advances to Step #34 which checks if the mode-selector switch 520 is on or off. This mode-selector switch 520 is set so as to turn on when the recording material is an OHP recording material and a clear image is to be reproduced on the OHP recording material; in other words, when the halftone reproduction with a white toner is not carried out.

If Step #34 finds that the switch 520 is off, which means that there is no need of stopping the halftone reproduction with white toner, the sequence advances to Step #35. In Step #34 if the switch 520 is found "on", the sequence returns to the main routine.

Step #35 checks if all the densities of "Y", "M" and "C" are lower than the threshold β, and if it finds that they are all lower than the β, the sequence advances to Step #36. The threshold β is previously stored in the RAM 52.

In Step #36 let the white density be W₀, which is stored in the RAM 52. The sequence advances to Step #37.

In Step #37 each density of "Y", "M" and "C" is multiplied by a coefficient γ to obtain new densities, wherein the γ is previously stored in the RAM 52. The new densities of "Y", "M" and "C" and the white density $W_0$ are stored in the RAM 53 as data.

In Step #31 if the answer is "No", which means that all the densities are not higher than the threshold α and not lower than the threshold β, the density is stored in the RAM 53 as it is. In this way the under-color removal and the white component calculation are finished.

A third embodiment will be described:

This embodiment has substantially the same structure as that of the printer of FIG. 1, and for simplicity, the drawing will be omitted. This embodiment is provided with the sensor 510 unlike the second embodiment of FIG. 11.

The control system has substantially the same internal structure as that of FIG. 2. Under the control system the color reproduction is conducted in the same sequence as shown in FIG. 3, except for Step #3, which is replaced by a sequence shown in FIG. 13.

Figure 13:
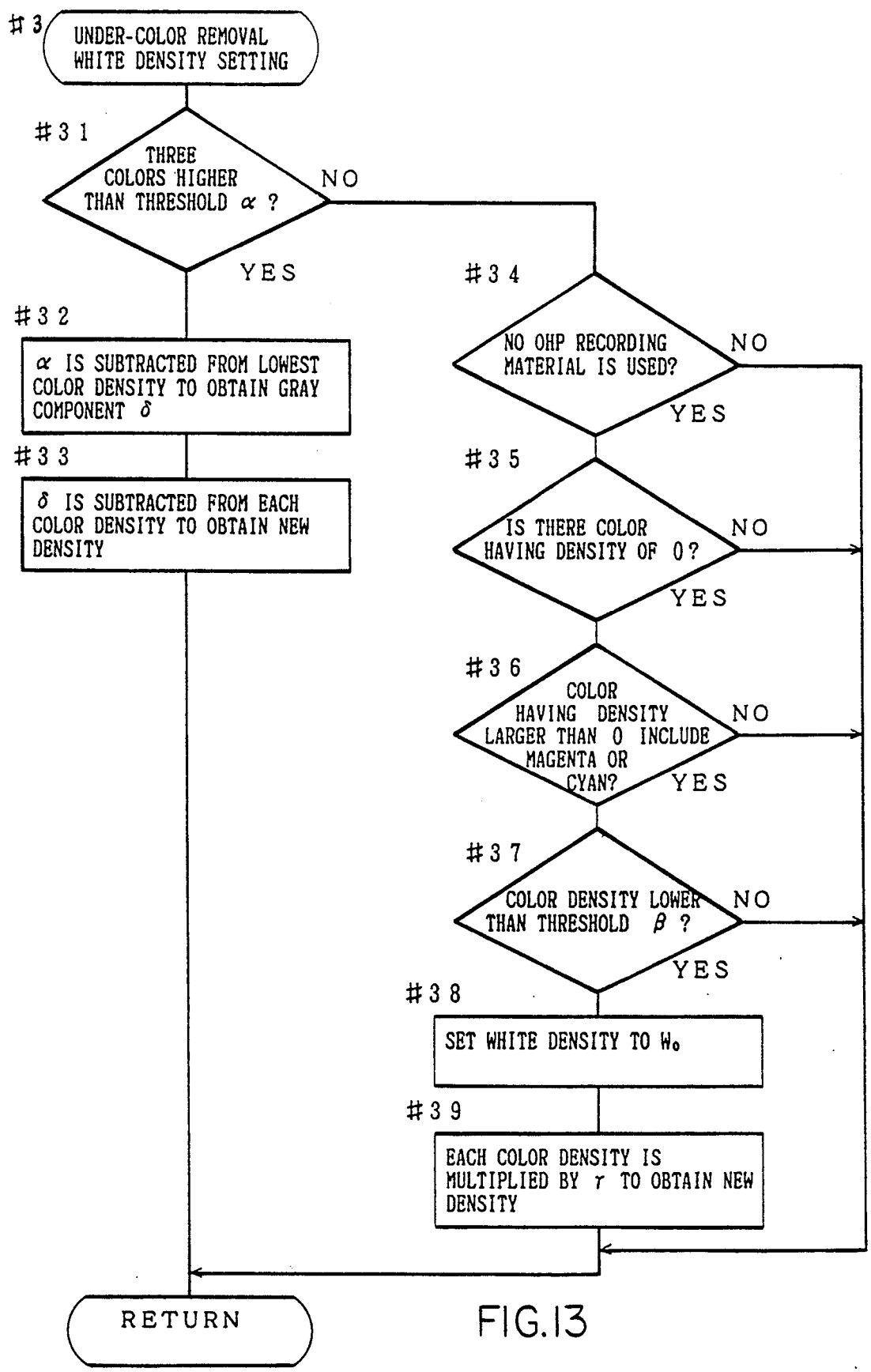
FIG. 13 is a flowchart showing a routine for performing the under-color removal and setting the white component density according to a third modification of the present invention.

Referring to FIG. 13, in Step #31 the density of each masked "Y", "M" and "C" is compared with the threshold α for the under-color removal which is stored in the RAM 52. If all the densities are higher than the α, the sequence advances to Step #32 where the α is subtracted from the lowest of the three densities to obtain the gray component δ.

In Step #33 the gray component δ is subtracted from each density of "Y", "M" and "C" to obtain new densities, and they are stored in the RAM 53 together with the gray component δ.

In Step #31 if any of the densities is found to be lower than the threshold α, the sequence advances to Step #34 which, in response to a signal from the sensor 510, checks if the recording material is an OHP recording material. In Step #34 if the recording material is found to be an OHP recording material, the sequence returns to the main routine. If the recording material is found to be an ordinary paper, the sequence advances to Step #35 which checks if any of the "Y", "M" and "C" has a density of 0 (zero).

If at least one of them is found to have a density of 0 (zero) the sequence advances to Step #36, which checks if the color having the density of any value other than 0 (zero) includes at least cyan or magenta. If it contains at least cyan or magenta, the sequence advances to Step #37, which checks if the density of the color (one or two colors) is lower than a threshold β for the halftone reproduction. If all the densities are found to be lower than the β, the sequence advances to Step #38. The threshold β is previously stored in the RAM 52.

In Step #38, let the white density be W₀, which is previously stored in the RAM 52. Then the sequence advances to Step #38.

In Step #38 one or two colors including cyan or magenta are multiplied by a coefficient γ to obtain new densities. The coefficient γ is previously stored in the RAM 52. The new densities obtained in Step #38 and the white density W₀ are stored in the RAM 53 as data.

FIG. 14 shows that when one or two of the densities of "Y", "M" and "C" obtained by the masking are 0 (zero), and the color having a density of any value other than 0 (zero) includes "M" or "C", the white component density is set.

Figure 14A:
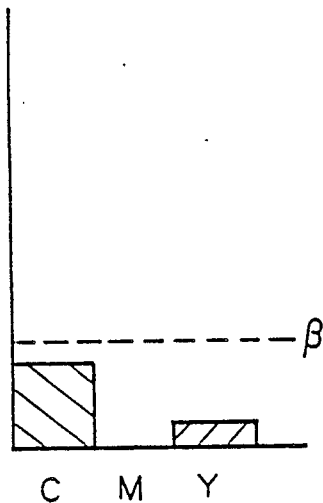
FIGS. 14A-14B are diagrammatic views illustrating the setting of the white component density according to the third modification.
Figure 14B:
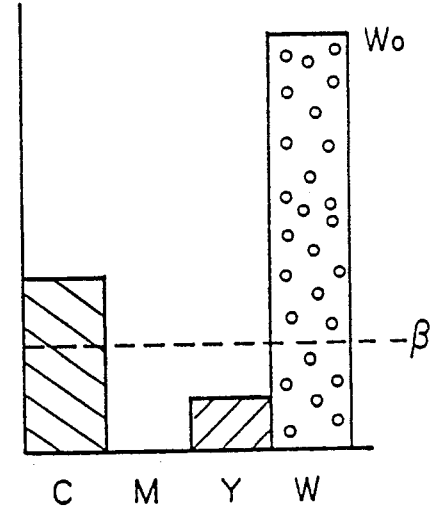

FIG. 14(a) shows that the density of "M" is 0, and that the densities of "Y" and "C" are lower than the threshold β. FIG. 14(b) shows that the white density W is replaced by W₀ and that the densities of "Y" and "C" are multiplied by γ.

In Step #35 if the answer is "No", which means that none of "Y", "M" and "C" has a density of 0 (zero), the white component density is not set.

Figure 15A:
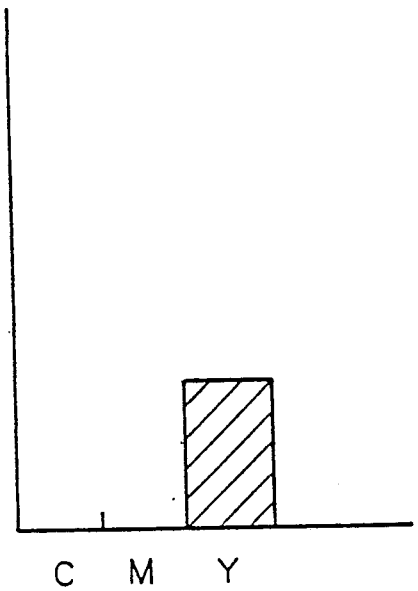
FIGS. 15(A)-15(B) are schematic views showing a case where the setting of a white component density is not carried out.
Figure 15B:
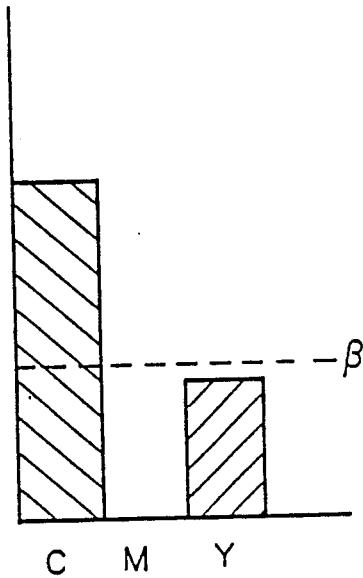

In Step #36 if the answer is "No", which means that as shown in FIG. 15(a) one of the colors has a density of 0 (zero) but the other colors do not contain cyan or magenta (i.e. each of "M" and "C" has a density of 0 (zero), which means that the color is only yellow), the white component density is not set.

In Step #37 if the density of one of the colors (one or two colors containing "M" or "C") is higher than the threshold β the white component density is not set.

When the white component density is not set, the density data are stored in the RAM 53. In this way the under-color removal and the white component density setting are finished.

As is evident from the foregoing description, the white component density setting takes place in the sequence from Step #35 to Step #38 in FIG. 13 if the number of colors is one or two, and at least one of them is cyan or magenta. The reasons are as follow:

(1) In the case of thick colors such as cyan and magenta it is difficult to reproduce clear pastel or halftone color because of the conspicuous scattering of dots. The yellow has no such problem because of its inherent light color.

(2) When "Y", "M" and "C" are printed together, the color density looks uniform even when the tone is light. However, when one or two of them are printed, the scattering of dots becomes conspicuous.

It will be understood from this that if the white component density is set only when the colors to be printed is one or two of "Y", "M" and "C" and at least "M" or "C" is contained, the resulting color image will be improved.

Since the other features of the third embodiment are the same as those of the first one, the description of them will be omitted.

It is possible to provide the third embodiment with the mode-selector switch 520 instead of the sensor 510. In this case, the sequence is the same as that of FIG. 13 except for Step #34 which is replaced by the Step #34 of FIG. 12.

It is possible to change and modify the present invention within the spirit and scope thereof. In the first to third embodiments a signal generator or alternatively, a sensor can be employed to check if the recording material is an OHP recording material or not. However, if the reproduction of a clear pastel or halftone color is solely aimed at, it is not necessary to use the signal generator or the sensor.

The first to third embodiments are based on electrophotographic color printing apparatus but the present invention can be applied to electrostatic printers, provided that the images are produced by toner layers. The application of the present invention is not limited to printers but can be applied to other color image forming apparatus such as copying machines.

The above-mentioned examples are based on the electrostatic transfer system but can be based on a direct printing system in which an image is directly printed on a recording material. The present invention also can be applied to thermal printers which print on heat sensitive paper by a thermal head.

What is claimed is:

1. An apparatus for producing a color image on a recording material, the apparatus comprising:
   first developing units each of which contains a developer of each of at least three primary colors;
   a first means for effecting a color separation of an image on an original to output image density data corresponding to each primary color;
   a second means for comparing the image density data with a predetermined value, multiplying the image density data by a predetermined ratio depending on the results of the comparison, and setting a predetermined density of a white image;
   a second developing unit containing a white developer; and
   a third means for controlling the formation of an image with said first developing units and said second developing unit, said third means including means for operating the second developing unit in response to the image density data obtained from the second means.

2. An apparatus as defined in claim 1, wherein the second means performs the multiplication and the predetermined white image density setting for a picture element whose image density data corresponding to the at least three primary colors are lower than the predetermined value.

3. An apparatus as defined in claim 1, wherein the second means performs the multiplication and the predetermined white image density setting for a picture element whose image density data corresponding to a selected one or more colors of the at least three primary colors are lower than the predetermined value.

4. An apparatus as defined in claim 3, wherein the at least three primary colors are yellow, magenta and cyan, and the selected one or more colors are two of them including at least one of magenta and cyan.

5. An apparatus as defined in claim 1, wherein the third means includes means for obtaining a binary image data from the image density data.

6. An apparatus as defined in claim 1, wherein a magnification of the image density used in the second means is substantially equal to the reciprocal of the reduction ratio of the density of a primary color owing to development by said white developer.

7. An apparatus for producing a color image on a recording material, the apparatus comprising:
   first developing units each of which contains a developer of each of at least three primary colors;
   a first means for effecting a color separation of an image on an original to output image density data corresponding to each primary color;
   a second means for comparing the image density data with a predetermined value, multiplying the image density data by a predetermined ratio depending on the results of the comparison, and setting a predetermined density of a white image;
   a second developing unit containing a white developer;
   a third means for controlling the formation of an image with said first developing units and said second developing unit, said third means including means for operating the second developing unit in response to the image density data obtained from the second means;
   means for generating a signal indicating that the recording material is a synthetic resin film; and
   a controlling means for keeping the second means out of operation in response to the signal indicating that the recording material is a synthetic resin film.

8. An apparatus as defined in claim 7, wherein the signal generating means is a switch operable from outside the apparatus.

9. The apparatus as defined in claim 7, wherein the signal generating means is a light reflector type of sensor disposed in a path along which the recording material is transported.

10. An apparatus as defined in claim 7, wherein the second means performs the multiplication and the predetermined white image density setting for a picture element whose image density data corresponding to the at least three primary colors are lower than the predetermined value.

11. An apparatus as defined in claim 7, wherein the second means performs the multiplication and the predetermined white image density setting for a picture element whose image density data corresponding to a selected one or more colors of the at least three primary colors are lower than the predetermined value.

12. An apparatus as defined in claim 11, wherein the at least three primary colors are yellow, magenta and cyan, and the selected one or more colors are two of them including at least one of magenta and cyan.

13. An apparatus as defined in claim 7, wherein the third means includes means for obtaining a binary image data from the image density data.

14. An apparatus as defined in claim 7, wherein a magnification of the image density used in the second means is substantially equal to the reciprocal of the reduction ratio of the density of a primary color owing to development by said white developer.

15. An apparatus for producing a color image on a recording material, the apparatus comprising:
first developing units each of which contains a developer for each of at least three primary colors;
a first means for effecting a color separation of an image on an original to output image density data corresponding to each primary color;
a first density setting means for comparing the image density data with a first predetermined value and effecting an under-color removal depending on the results of the comparison;
a second density setting means for comparing the image density data with a second predetermined value and multiplying the image density data by a predetermined ratio depending on the results of the comparison, and setting a predetermined density of a white image;
a second developing unit containing a white developer;
a first controlling means for controlling the formation of an image using the first developing units but without using the second developing unit in response to density data provided by the first density setting means; and
a second controlling means for controlling the formation of an image using the second developing unit in response to density data provided by the second density setting means.

16. An apparatus as defined in claim 15, wherein the first predetermined value is larger than the second predetermined value.

17. An apparatus as defined in claim 15, wherein the first density setting means performs the under-color removal for a picture element whose image density data corresponding to the at least three primary colors are higher than the first predetermined value.

18. An apparatus as defined in claim 15, wherein the second density setting means performs the multiplication and the predetermined white image density setting for a picture element whose image density data corresponding to the at least three primary colors are lower than the second predetermined value.

19. An apparatus as defined in claim 15, wherein the second density setting means performs the multiplication and the predetermined white image density setting for a picture element whose image density data corresponding to a selected one or more colors of the at least three primary colors are lower than the second predetermined value.

20. An apparatus as defined in claim 19, wherein the at least three primary colors are yellow, magenta and cyan, and the selected one or more colors are two of them including at least one of magenta and cyan.

21. An apparatus as defined in claim 15, wherein a magnification of the image density used in the second density setting means is substantially equal to the reciprocal of the reduction ratio of the density of a primary color owing to development by said white developer.

22. An apparatus as defined in claim 15, wherein the first means includes a section in which masking is carried out.

23. An apparatus for producing a color image on a recording material, the apparatus comprising:
first developing units each of which contains a developer for each of at least three primary colors;
a first means for effecting a color separation of an image on an original to output image density data corresponding to each primary color;
a first density setting means for comparing the image density data with a first predetermined value and effecting an under-color removal depending on the results of the comparison;
a second density setting means for comparing the image density data with a second predetermined value and multiplying the image density data by a predetermined ratio depending on the results of the comparison, and setting a predetermined density of a white image;
a second developing unit containing a white developer;
a first controlling means for controlling the formation of an image using the first developing units but without using the second developing unit in response to density data provided by the first density setting means;
a second controlling means for controlling the formation of an image using the second developing unit in response to density data provided by the second density setting means;
means for generating a signal indicating that the recording material is a synthetic resin film; and
a controller which controls the second density setting means to be out of operation in response to the signal indicating that the recording material is a synthetic resin film.

24. An apparatus as defined in claim 23, wherein the first predetermined value is larger than the second predetermined value.

25. An apparatus as defined in claim 23, wherein the first density setting means performs the under-color removal for a picture element whose image density data corresponding to the at least three primary colors are higher than the first predetermined value.

26. An apparatus as defined in claim 23, wherein the second density setting means performs the multiplication and the predetermined white image density setting for a picture element whose image density data corresponding to the at least three primary colors are lower than the second predetermined value.

27. An apparatus as defined in claim 23, wherein the second density setting means performs the multiplication and the predetermined white image density setting for a picture element whose image density data corresponding to a selected one or more colors of the at least three primary colors are lower than the second predetermined value.

28. An apparatus as defined in claim 27, wherein the at least three primary colors are yellow, magenta and cyan, and the selected one or more colors are two of them including at least one of magenta and cyan.

29. An apparatus as defined in claim 23, wherein a magnification of the image density used in the second density setting means is substantially equal to the reciprocal of the reduction ratio of the density of a primary color owing to development by said white developer.

30. An apparatus as defined in claim 23, wherein said first means includes a section in which masking is carried out.

31. An apparatus for forming electrostatic latent images on an electrostatic latent image carrier corresponding to respective color components, developing the latent image with respective color developers, and transferring each developed image onto a recording material thereby to obtain a multi-color image, the apparatus comprising:

a plurality of first developing units each of which contains a developer of each of three primary colors;

a second developing unit containing a white developer;

a first means for effecting a color separation of an image on an original to output image density data corresponding to each primary color;

a second means for comparing the image density data with a predetermined value; and means for alternatively controlling a first copying mode or a second copying mode, wherein the first copying mode is to form electrostatic latent images corresponding to the three primary colors, develop them by use of the plurality of first developing units, and transfer the developed images onto the recording material, when the second means finds that the image density data are higher than the predetermined value, and wherein the second copying mode is to form electrostatic latent images corresponding to the three primary colors and a white color, develop these images by use of the plurality of first developing units and the second developing unit, and transfer the developed images onto the recording material when the second means finds that the image density data are lower than the predetermined value.

* * * * *